Nov. 25, 1958     A. O. OLSEN     2,861,852
PISTON AND PISTON RING ASSEMBLY
Filed July 18, 1957
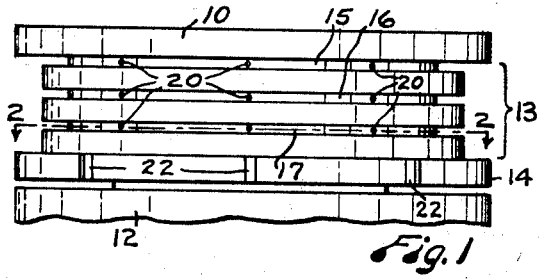
Fig. 1
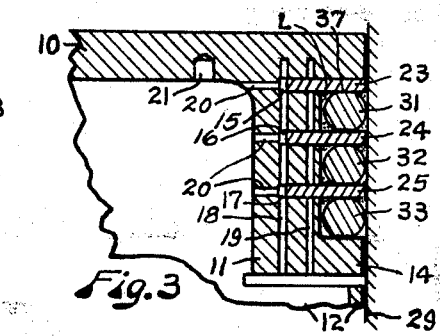
Fig. 3
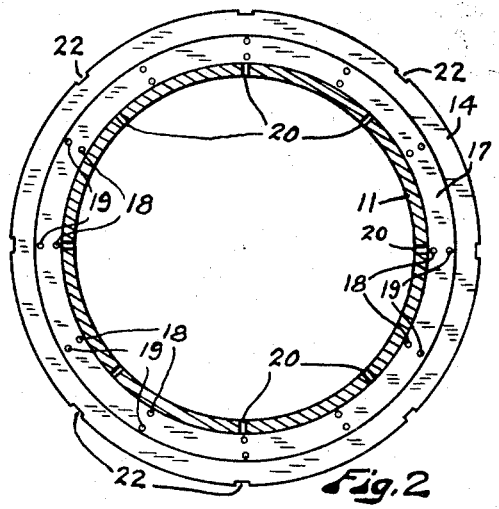
Fig. 2
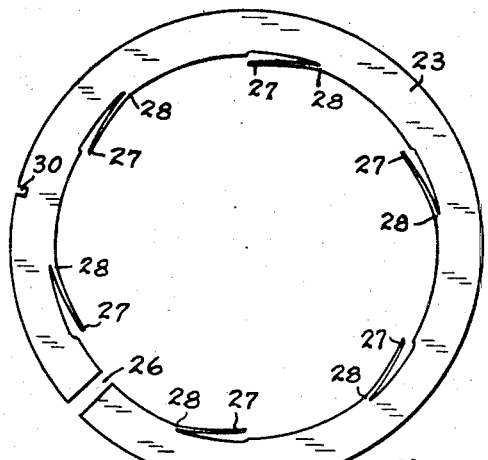
Fig. 4
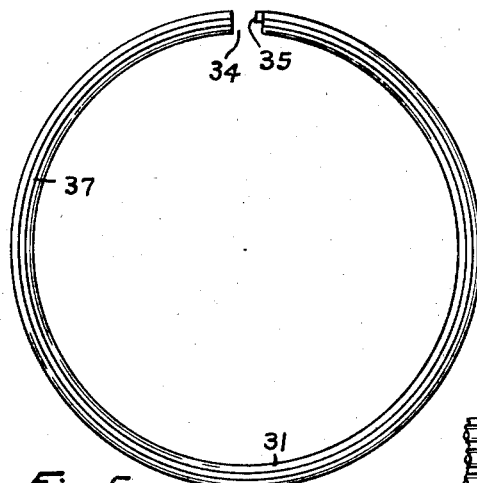
Fig. 5
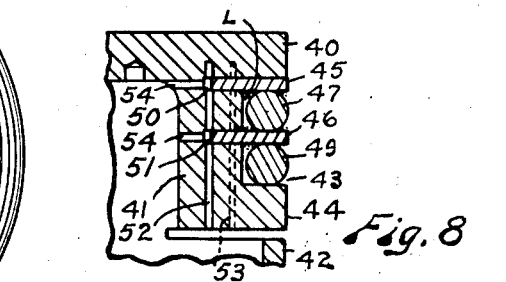
Fig. 8
Fig. 6
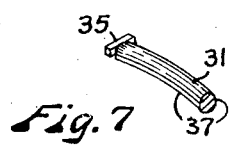
Fig. 7
INVENTOR.
Arnt Olaf Olsen
BY Fred C. Matheny
ATTORNEY

United States Patent Office 2,861,852
Patented Nov. 25, 1958

2,861,852

PISTON AND PISTON RING ASSEMBLY

Arnt Olaf Olsen, Seattle, Wash.

Application July 18, 1957, Serial No. 672,833

11 Claims. (Cl. 309—44)

My invention relates to a piston and piston ring assembly and an object of my invention is to provide a piston and piston ring assembly which is highly efficient in providing a seal between the circumferential wall of a piston and the cylinder in which it operates.

Another object is to provide a piston and piston ring assembly having oil passageways which insure efficient circulation of oil for lubricating purposes and which further facilitate using the oil for cooling purposes.

Another object is to provide a piston and piston ring assembly which comprises split compression and oil rings disposed between thin flat split cooling rings and in which all of these split rings are free to move rotatively around the piston, as a floating ring assembly, but are keyed together so that they can not move rotatively relative to each other thus preventing the split portions of these rings from getting into alignment with each other.

Another object is to provide a piston and ring assembly in which some of the rings are thin, flat, relatively wide, split cooling rings which have integrally formed resilient pawl shaped expander springs provided around their inner circumferential portions.

Another object is to provide a piston and ring assembly in which at least some of the rings are magnetized and in which a heavy paste lubricant having finely divided magnetic material therein is used with and tends to adhere to said magnetized rings in such a manner as to provide better and more efficient lubrication.

Another object is to provide a piston and ring structure which will break or reduce undesirable vacuum without reducing the vacuum effective for fuel intake purposes and without reducing the efficiency of the seal on the compression and power strokes of the piston.

Other objects of this invention will be apparent from the following description taken in connection with the accompanying drawings.

In the drawings Figure 1 is a fragmentary view in elevation, with the rings omitted, of a piston constructed in accordance with my invention.

Fig. 2 is a sectional view through said piston taken substantially on broken line 2—2 of Fig. 1.

Fig. 3 is a fragmentary view in radial section, on a larger scale than Figs. 1 and 2, showing the piston with rings applied thereto.

Fig. 4 is a detached plan view of a thin flat cooling ring used in my piston and ring assembly.

Fig. 5 is a detached plan view of a compression and oil seal ring used in my piston and ring assembly.

Fig. 6 is a detached diagrammatic view, showing in a flat plane, an assembly of the six split rings illustrated in Figs. 3, 4 and 5 and showing how these six rings are keyed together so they can not move rotatively relative to each other but are free to move rotatively as an assembly on the piston.

Fig. 7 is a detached fragmentary perspective view showing an end portion of a piston ring with a cross key welded thereto.

Fig. 8 is a fragmentary view in radial cross section similar to Fig. 3 but showing a piston with a less number of rings in the ring assembly.

Like reference numerals refer to like parts throughout the several views.

Figs. 1 to 7 inclusive show a piston and ring assembly in which the piston comprises a head 10, a thicker ring carrying portion 11 adjacent said head 10 and a piston skirt 12 of any suitable form, a fragment of which is shown. The ring carrying portion 11 has a relatively wide shallow annular groove 13 extending from the head 10 to a land 14 at the end of the ring carrying portion opposite said head 10.

Three narrow annular spaced apart grooves 15, 16 and 17 are provided in the bottom of the shallower wide groove 13. The uppermost narrow groove 15, shown in Figs. 1 and 3 is flush with the innermost wall of the piston head 10. The lowermost narrow groove 17 is spaced a substantial distance from the uppermost wall of the land 14 and the medial narrow groove 16 is positioned half way between the grooves 15 and 17.

The thicker ring carrying portion 11 of the piston is provided with two sets of longitudinally extending oil perforations 18 and 19. These perforations 18 and 19 extend from the lower end of the thickened portion 11 of the piston upwardly and intersect the grooves 15, 16 and 17 and extend beyond the uppermost groove 15 into the piston head 10. Also other oil circulation perforations 20 extend between the bottoms of the grooves 15, 16 and 17 and the inner wall of the piston. I also preferably drill a plurality of shallow holes 21 from the inside upwardly into the piston head 10 so that oil may enter into these holes 21 for cooling the head 10 of the piston. I further provide notches 22 extending across the peripheral portion of the land 14 in the interest of better oil circulation. The perforations 18, 19 and 20 and the notches 22 all cooperate to insure a freer circulation of oil with better lubrication and better cooling.

Three thin flat cooling rings 23, 24 and 25, of duplicate construction, are disposed within the respective grooves 15, 16 and 17. One of said cooling rings, in this instance the ring 23, is shown in plan in Fig. 4. Each cooling ring has the usual split 26 to facilitate installation and to permit expansion and contraction. Also each cooling ring is internally provided with a plurality of equidistantly spaced resilient expander pawls 27. Each pawl 27 is formed by making a cut in the cooling ring parallel and adjacent to the inner circumferential wall thereof so as to sever all parts except one end of a thin sliver of metal from the ring, leaving the end 28 of each pawl 27 integrally connected with the ring. Each pawl is bent outwardly so it stands away from the ring and functions as an expander spring. Preferably the cooling rings are tempered after the pawls 27 are formed thereon. The pawls 27 keep the cooling rings evenly expanded with a desired pressure against the wall 29, Fig. 3, of the cylinder in which the piston operates. Each cooling ring 23 is externally provided with at least one peripheral notch 30 and the two cooling rings 24 and 25 are provided with preferably two similar notches 30, see Fig. 6.

The uppermost cooling ring 23 has one flat side in contact with the piston head 10 and this helps in cooling said head 10, which is the most highly heated part of the piston. The lowermost cooling ring 25 is preferably spaced from the adjacent land 14 and the cooling ring 24 is positioned midway between the rings 23 and 25. Thus the rings 23, 24 and 25 and the land 14 cooperate in subdividing the wide groove 13 into three annular grooves for the reception of three compression and oil seal rings 31, 32 and 33 of duplicate construction, the ring 31 being shown in Fig. 5. The rings 31, 32 and 33 are similar to the piston ring disclosed in my prior patent application Serial No. 638,347, filed February 5, 1957.

Each ring 31, 32 and 33 has a split 34 and is of cylindrical cross section except that it is slightly flattened on both sides to provide on each side a narrow flat contact surface 37. The outer periphery of each ring 31, 32 and 33 is of round cross section so that the ring has a circular line of contact with the cylinder wall 29 and friction is reduced to a minimum.

Since all of the rings 23, 24, 25, 31, 32 and 33 are split rings and can move around the piston in their respective grooves it is desirable to interconnect these rings in such a manner as to prevent the rings from assuming positions in which the splits 26 and 34 therein are in registration or longitudinal alignment with each other. This is accomplished by welding to one end of each compression ring 31, 32 and 33 a transverse key member or anchor bar 35. If the compression ring is to be used between two cooling rings then the cross bar extends beyond both sides of the compression ring to which it is welded and has its end portions positioned in peripheral notches 30 of the two adjacent cooling rings. The anchor bar 35 on the compression ring 33 which is positioned adjacent the land 14 only overhangs at one end and is positioned so that it is clear of the land 14 but has its overhanging end portion in a notch 30 in the cooling ring 25. It will be noted that only one notch 30 is required in the cooling ring 23 while two notches 30 are needed in each of the cooling rings 24 and 25. By the means just described all of the rings 23, 24, 25, 31, 32 and 33 are interconnected so that they cannot be moved rotatively relative to each other but can move or float rotatively as a unit on the piston.

The cooling rings 23 are wider than ordinary piston rings and for this reason are fairly stiff. The pawls 27 insure even and uniform contact of these rings with the cylinder walls at all times.

The cooling rings 23, 24 and 25 are preferably all magnetized to a sufficient extent so they will attract and tend to hold a paste lubricant L, Figs. 3 and 8, which contains magnetic material. For example, one satisfactory paste lubricant having magnetic characteristics may be made from heavy petroleum base oil or grease having finely divided or finely powdered iron mixed therewith, the iron preferably being a soft iron. This paste lubricant can be packed around all of the compression and cooling rings at the time the rings are assembled on the piston and it will tend to stay in the ring grooves. Also some of this paste can be introduced into the oil and it will soon collect around the magnetized rings where it will serve as a lubricant and help in forming a seal between the piston and the cylinder walls. The magnetized rings will also tend to pick up and hold wear particles of magnetic material which get into the circulating oil.

The cooling rings 23, 24 and 25 fit loosely enough in the grooves 15, 16 and 17 to allow some oil to work around these rings. The perforations 18 intersect the grooves 15, 16 and 17 near the bottoms of said grooves and the cooling rings do not afford much obstruction to circulation of oil in these perforations 18 since the cooling rings are always clear of the bottoms of the grooves. The perforations 20 allow oil to pass from the inside of the piston into the grooves 15, 16 and 17 and the perforations 19 help some in the circulation of the oil. The oil which thus circulates in the ring grooves and around the rings 23, 24 and 25 helps to cool these rings and the rings 23, 24 and 25, being in contact with the compression rings 31, 32 and 33 and the piston head 10 helps in keeping the piston head and compression rings cool. The notches 22 allow oil to drain freely from the groove which contains the lowermost compression ring 33.

Fig. 8 shows a piston having a less number of rings than the piston shown in Figs. 1, 2 and 3. The piston shown in Fig. 8 comprises a head 40, a thicker ring carrying part 41 and a skirt 42. The part 41 has a relatively wide shallow groove 43 extending between the head 40 and a land 44 and has two narrower and deeper grooves 50 and 51 for the reception of cooling rings 45 and 46. The rings 45 and 46 are similar to the cooling rings 23 shown in Figs. 3 and 4. Two compression and oil seal rings 47 and 49, similar to the ring 37 of Fig. 5, are provided in the two grooves formed by cooling rings 45 and 46 and land 44. Oil circulation passageways 52, 53 and 54, similar respectively to the previously described passageways 18, 19 and 20, are provided. The piston ring assembly shown in Fig. 8 functions in substantially the same manner as the piston and ring assembly shown in Figs. 1 to 7 inclusive.

In the structure shown in both Figs. 1 to 7 and Fig. 8 two thin flat magnetized cooling rings, urged outwardly by resilient integral expander members, cooperate to form the two side walls of a compression ring receiving groove of generally rectangular shape cross sectionally considered. A split compression ring of approximately cylindrical cross sectional shape is disposed within said groove and, by reason of its shape, leaves corner spaces which are packed with heavy lubricant containing a finely divided magnetic material. The magnetized rings hold the magnetic material and the lubricant is gradually released and helps to lubricate the rings and piston and cylinder.

The foregoing description and accompanying drawings clearly disclose preferred embodiments of my invention but it will be understood that this disclosure is merely illustrative and that changes may be made within the scope of the following claims.

I claim:

1. In a piston and ring assembly, a piston having a wide annular ring receiving groove; at least one narrow groove in the bottom of said wide annular groove; a thin flat cooling ring in said narrow groove; and two compression and oil rings in said wider annular groove on opposite sides of said cooling ring, said cooling ring separating said two compression rings and being in contact with the same.

2. In a piston and ring assembly, a piston having a wide annular ring receiving groove and having a plurality of spaced apart narrower annular grooves in the bottom of said wide annular groove; and a thin flat cooling ring in each of said narrower annular grooves, said thin flat cooling rings dividing said wide annular groove into a plurality of compression ring receiving grooves.

3. In a piston and ring assembly, a piston having a head and having a wide annular groove adjacent said head; three spaced apart narrow annular grooves in the bottom of said wide groove, one of said narrow annular grooves being adjacent said head and at the end of said wide annular groove, another of said narrow annular grooves being spaced from the other end of said wide annular groove and a third narrow annular groove being positioned midway between the two just mentioned narrow annular grooves; a thin flat cooling ring in each of said narrow annular grooves, all of said cooling rings extending outwardly beyond the bottom of said wide annular groove and cooperating with each other and with said piston in providing three annular compression ring receiving grooves; and three split compression rings in said three annular compression ring receiving grooves.

4. In a piston and ring assembly, a piston having a head and having a ring carrying portion adjacent said head, said ring carrying portion having a wide annular external ring receiving groove and having a plurality of spaced apart narrower annular grooves in the bottom of said wide annular groove, said ring carrying portion further having oil perforations extending from the lower end thereof upwardly intersecting said narrower annular grooves and having other perforations extending between the bottoms of said narrower grooves and the inside of said ring carrying portion; and a thin flat cooling ring disposed in each of said narrower grooves, said cooling rings dividing said wide annular groove into a plurality of compression ring receiving grooves.

5. In a piston and ring assembly, a piston having a head and having a ring carrying portion adjacent said head, said ring carrying portion having a wide annular external ring receiving groove and having a plurality of spaced apart narrower annular grooves in the bottom of said wide annular groove, said ring carrying portion further having oil perforations extending from the lower end thereof upwardly intersecting said narrower annular grooves; a thin flat cooling ring in each of said narrower grooves; all of said cooling rings terminating substantially flush with the outer periphery of said ring carrying portion whereby said wide annular groove is divided into a plurality of compression ring receiving grooves; and a compression ring in each of said compression ring receiving grooves.

6. The apparatus as claimed in claim 5 in which each of said compression rings is a split ring of approximately cylindrical cross section.

7. In a piston and ring assembly, a piston having a head and having a thick walled ring carrying portion adjacent said head; a wide annular ring receiving groove in the exterior of said ring carrying portion, said wide annular groove having shoulders at both ends thereof; a plurality of spaced apart narrow annular grooves in the bottom of said wide annular groove; oil perforations extending from the lower end of said ring carrying portion upwardly intersecting said narrower annular grooves; other perforations extending between the bottoms of said narrower grooves and the inside wall of said ring carrying portion; a thin flat cooling ring in each of said narrower grooves, each of said cooling rings extending outwardly beyond the bottom of said wide annular groove and terminating approximately flush with the outer circumferential wall of said ring carrying portion, said cooling rings cooperating with each other and with the shoulders at the ends of said wide annular groove in forming compression ring receiving grooves; and a compression ring in each of said compression ring receiving grooves.

8. In a piston and ring assembly, a piston having a wide annular external ring receiving groove and having a plurality of spaced apart narrower annular grooves in the bottom of said wide annular groove; a thin flat split cooling ring in each of said narrower grooves, said cooling rings cooperating in forming compression ring receiving grooves within said wide annular groove, said cooling rings having peripheral notches; a split compression ring in each compression ring receiving groove; and a transverse key member welded to an end of each compression ring, each key member having end portions overhanging adjacent cooling rings and positioned in peripheral notches in adjacent cooling rings, whereby said cooling rings and compression rings are anchored against rotary movement relative to each other and are movable as an assembly around the piston.

9. In a piston and ring assembly, a piston having a head and having a ring carrying portion adjacent said head, said ring carrying portion having a wide annular external ring receiving groove and having at least two spaced apart narrow annular grooves in the bottom of said wide annular groove; a thin flat cooling ring in each of said narrow annular grooves; said cooling rings terminating substantially flush with the periphery of said ring carrying portion and forming the side walls of a compression ring receiving groove; a plurality of resilient expander pawls integral with the innermost circumferential edge portion of each thin flat cooling ring yieldingly exerting an expanding pressure on the cooling ring; and a compression ring disposed in the compression ring receiving groove between the cooling rings.

10. In a piston ring, a thin flat split ring member; and a plurality of resilient spaced apart expander pawls each having one end portion integral and unitary with the innermost circumferential portion of said thin flat ring member and the other end portion slightly spaced from said thin flat ring member.

11. In a piston and ring assembly, a piston having a head and having a ring carrying portion adjacent said head, said ring carrying portion having a wide annular external ring receiving groove and having a plurality of spaced apart narrow annular grooves in the bottom of said wide annular groove; a thin flat magnetized cooling ring disposed in each of said narrower grooves, said cooling rings dividing said wide annular groove into a plurality of compression ring receiving grooves of rectangular cross section; a compression ring of approximately round cross section disposed in each of said compression ring receiving grooves, said compression ring leaving spaces in the corners of said compression ring receiving grooves; and lubricating material including a heavy lubricant having finely divided magnetic material therein disposed within the corner spaces of said compression ring receiving grooves and magnetically held by said magnetized cooling rings.

No references cited.